United States Patent
Tingaud et al.

(10) Patent No.: US 9,683,484 B2
(45) Date of Patent: Jun. 20, 2017

(54) ADJUSTABLE-TRIM CENTRIFUGAL COMPRESSOR, AND TURBOCHARGER HAVING SAME

(71) Applicant: Honeywell International Inc., Morristown, NJ (US)

(72) Inventors: Aurelien Tingaud, Thaon les vosgues (FR); Damien Marsal, Golbey (FR); Chris Groves, Domevre sur Durbion (FR); Alain Lombard, Chavelot (FR); Lionel Toussaint, Gerardmer (FR); Hani Mohtar, Chaumousey (FR)

(73) Assignee: Honeywell International Inc., Morris Plains, NJ (US)

( * ) Notice: Subject to any disclaimer, the term of this patent is extended or adjusted under 35 U.S.C. 154(b) by 288 days.

(21) Appl. No.: 14/642,825

(22) Filed: Mar. 10, 2015

(65) Prior Publication Data

US 2016/0265424 A1    Sep. 15, 2016

(51) Int. Cl.
*F02B 37/24*    (2006.01)
*F04D 27/02*    (2006.01)
(Continued)

(52) U.S. Cl.
CPC .............. *F02B 37/24* (2013.01); *F02B 37/12* (2013.01); *F04D 27/0253* (2013.01);
(Continued)

(58) Field of Classification Search
CPC .... F04D 27/0253; F04D 29/464; F02B 37/12; F02B 2037/125; F02C 37/24; F05D 2220/40; F05D 2250/51; Y02T 10/144
See application file for complete search history.

(56) References Cited

U.S. PATENT DOCUMENTS 6,129,511 A * 10/2000 Salvage ............... F01D 17/02
                                                      415/1
6,623,239 B2 * 9/2003 Sahay ..................... F02B 37/16
                                                      415/11
(Continued)

FOREIGN PATENT DOCUMENTS

DE    102010026176 A1    1/2012
DE    102011121996 B4    6/2013
(Continued)

*Primary Examiner* — Igor Kershteyn
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes a variable-geometry conduit comprising a plurality of vanes that in the closed position collectively form a converging inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conduit. The vanes in the open position are pivoted radially outwardly so as to increase the trailing edge inner diameter of the inlet member and thereby increase the effective diameter of the air inlet at the inducer portion.

5 Claims, 8 Drawing Sheets

(51) Int. Cl.
*F04D 29/46* (2006.01)
*F02B 37/12* (2006.01)

(52) U.S. Cl.
CPC ...... *F04D 29/464* (2013.01); *F02B 2037/125* (2013.01); *F05D 2220/40* (2013.01); *F05D 2250/51* (2013.01); *Y02T 10/144* (2013.01)

(56) References Cited

U.S. PATENT DOCUMENTS

| | | | | |
|---|---|---|---|---|
| 7,083,379 | B2* | 8/2006 | Nikpour | F04D 27/0246 |
| | | | | 415/144 |
| 2009/0104024 | A1* | 4/2009 | Kay | F01D 5/147 |
| | | | | 415/161 |
| 2014/0308110 | A1* | 10/2014 | Houst | F02B 37/22 |
| | | | | 415/1 |
| 2016/0177956 | A1* | 6/2016 | Mohtar | F01D 17/146 |
| | | | | 417/406 |

FOREIGN PATENT DOCUMENTS

| | | | | | |
|---|---|---|---|---|---|
| DE | 102013003418 | A1 * | 8/2014 | ........... | F04D 29/464 |
| JP | 3719337 | B2 | 9/2005 | | |
| WO | 2013074503 | A1 | 5/2013 | | |

* cited by examiner

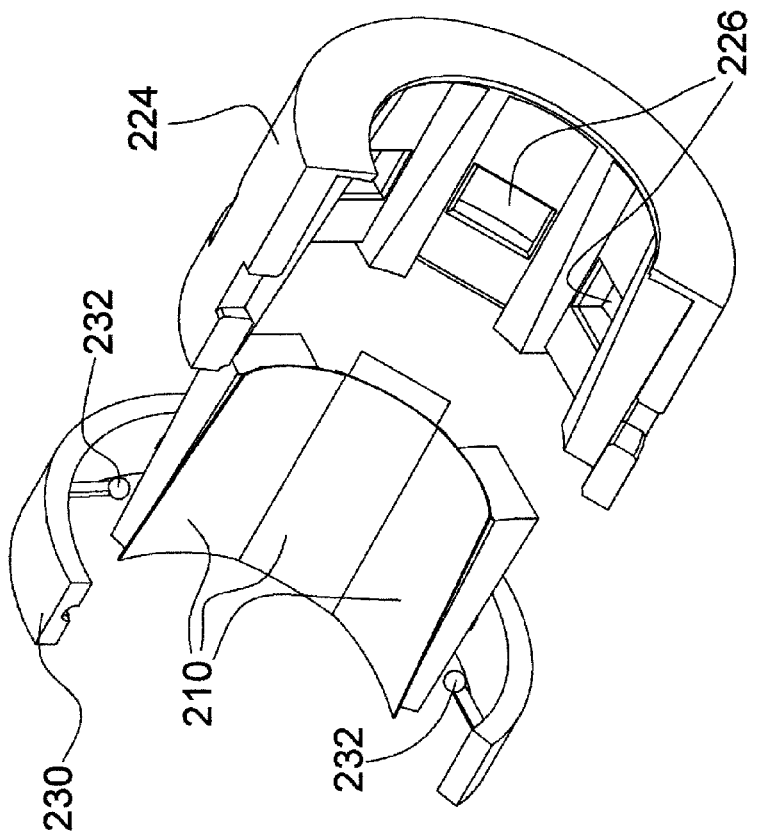
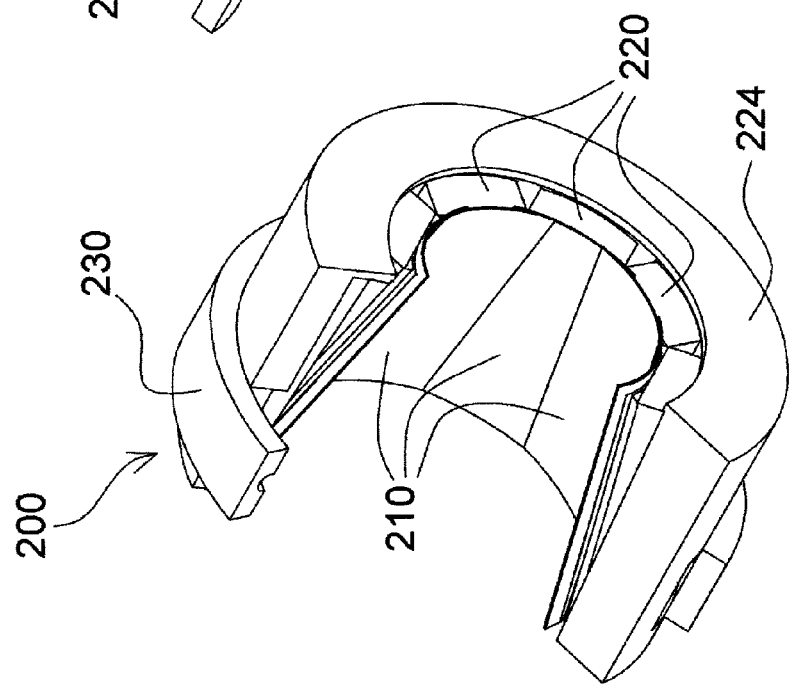
FIG. 8A
FIG. 8

ADJUSTABLE-TRIM CENTRIFUGAL COMPRESSOR, AND TURBOCHARGER HAVING SAME

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface that extends for an axial length along a downstream direction, followed by a compressor inlet-adjustment mechanism disposed in the air inlet, followed by a shroud surface that is adjacent to outer tips of the blades of the compressor wheel.

The compressor inlet-adjustment mechanism is movable between an open position and a closed position, the inlet-adjustment mechanism comprising a variable-geometry conduit comprising a plurality of vanes that pivot about their leading edges or about a point intermediate between the leading and trailing edges. In the closed position the vanes collectively form a converging inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conduit. The vanes in the open position are pivoted radially outwardly so as to increase the trailing edge inner diameter of the inlet member and thereby increase the effective diameter of the air inlet at the inducer portion.

The variable-geometry conduit in one embodiment includes a plurality of vane-moving members disposed on radially outer sides of the vanes, wherein each of the vane-moving members pivots about a leading edge of the vane-moving member, a movable actuator member engaged with the vane-moving members, and a transmission that converts the movement of the actuator member into pivoting of the vane-moving members for moving the variable-geometry conduit between the closed and open positions respectively.

The actuator member in one embodiment is axially movable for adjusting the inlet-adjustment mechanism between the open and closed positions. The transmission can include control arms that have respective radially outer ends engaged with the actuator member and radially inner ends respectively engaged with the vane-moving members. The control arms are arranged such that axial movement of the actuator member causes the control arms to pivot about respective axes that extend substantially in a circumferential direction about an axis of the compressor, wherein in one axial position of the actuator member the control arms are tilted more toward the circumferential direction of the compressor, and in another axial position of the actuator member the control arms are tilted less in the circumferential direction and more in a radial direction of the compressor. The inner ends of the control arms engage the vane-moving members at a location spaced downstream from the leading edges of the vane-moving members, such that pivoting of the control arms causes the vane-moving members to pivot which in turn causes the vanes to also pivot.

In another embodiment, the actuator member is rotatable for adjusting the inlet-adjustment mechanism between the open and closed positions. The transmission includes control arms that have respective radially outer ends engaged with the actuator member and radially inner ends respectively engaged with the vane-moving members. The control arms are arranged such that rotational movement of the actuator member causes the control arms to pivot about respective axes that extend substantially in an axial direction of the compressor, wherein in one rotational position of the actuator member the control arms are tilted more toward a circumferential direction about an axis of the compressor, and in another rotational position of the actuator member the control arms are tilted less in the circumferential direction and more in a radial direction. The inner ends of the control arms engage the vane-moving members at a location spaced downstream from the leading edges of the vane-moving members such that pivoting of the control arms causes the vane-moving members to pivot which in turn causes the vanes to also pivot.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5A is a sectioned perspective view of the inlet-adjustment mechanism of the first embodiment, in the open position;

FIG. 6A is a view similar to FIG. 5A, with the inlet-adjustment mechanism in the closed position;

FIG. 8 is a view similar to FIG. 6A, but showing a second embodiment having a rotary actuator member; and FIG. 8A is an exploded, sectioned view of the inlet-adjustment mechanism in accordance with the second embodiment.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
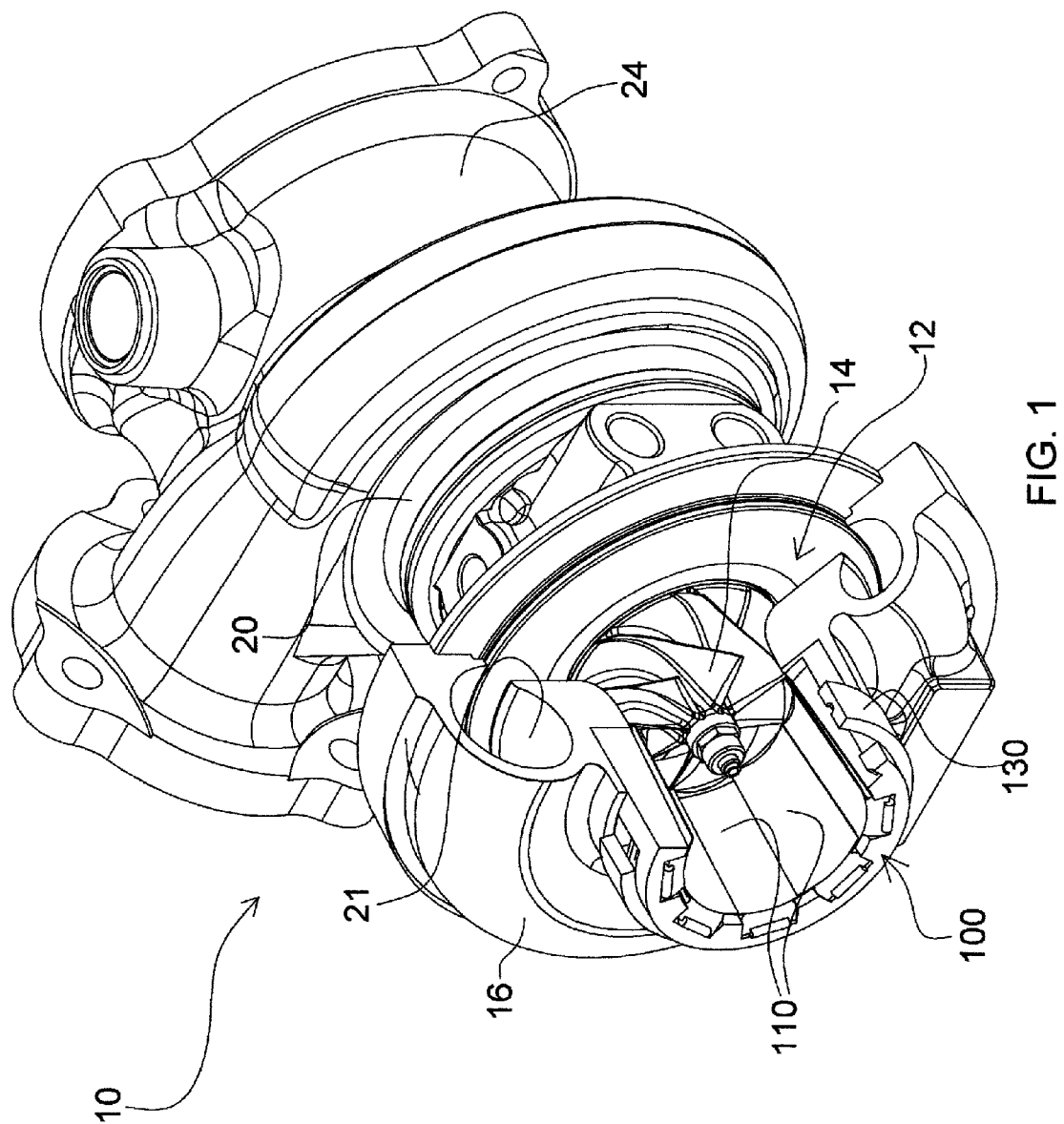
FIG. 1 is a perspective view of a turbocharger, with a portion of the compressor housing cut away to show internal details, in accordance with a first embodiment of the invention, wherein the inlet-adjustment mechanism is in the open position.
Figure 2:
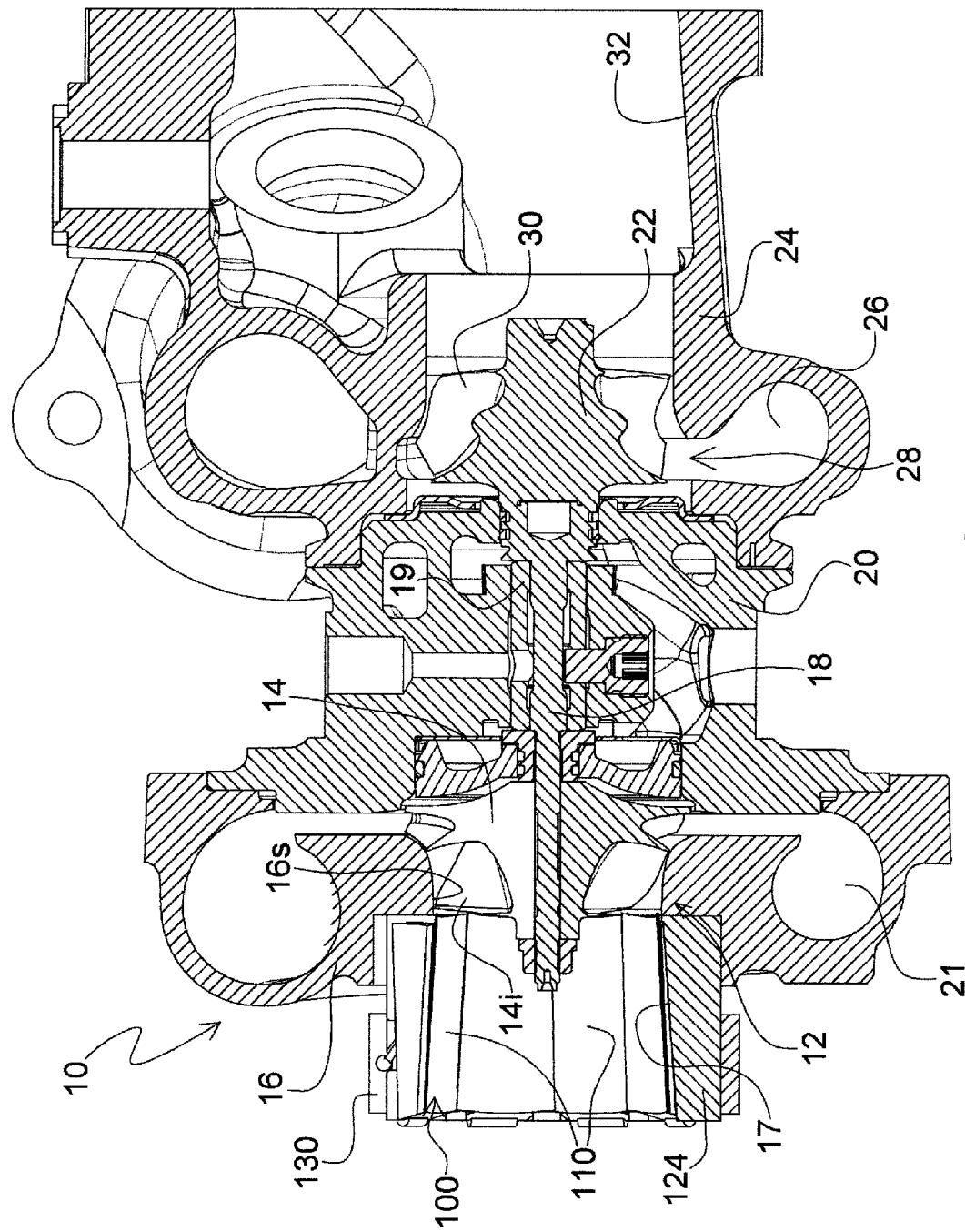
FIG. 2 is an axial cross-sectional view of the turbocharger of FIG. 1, with the inlet-adjustment mechanism in the open position.

A turbocharger 10 in accordance with one embodiment of the invention is illustrated in perspective view in FIG. 1, and in cross-sectional view in FIG. 2. The turbocharger comprises a compressor 12 having a compressor wheel or impeller 14 mounted in a compressor housing 16 on one end of a rotatable shaft 18. The compressor housing defines an air inlet 17 for leading air generally axially into the compressor wheel 14. The shaft 18 is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The compressor housing 16 defines a shroud surface 16s that is closely adjacent to the radially outer tips of the compressor blades. The shroud surface 16s defines a curved contour that is generally parallel to the contour of the compressor wheel. At the inlet to the inducer portion 14i of the compressor wheel, the shroud surface 16s has a diameter that is slightly greater than the diameter of the inducer portion 14i.

The turbocharger further includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Figure 3:
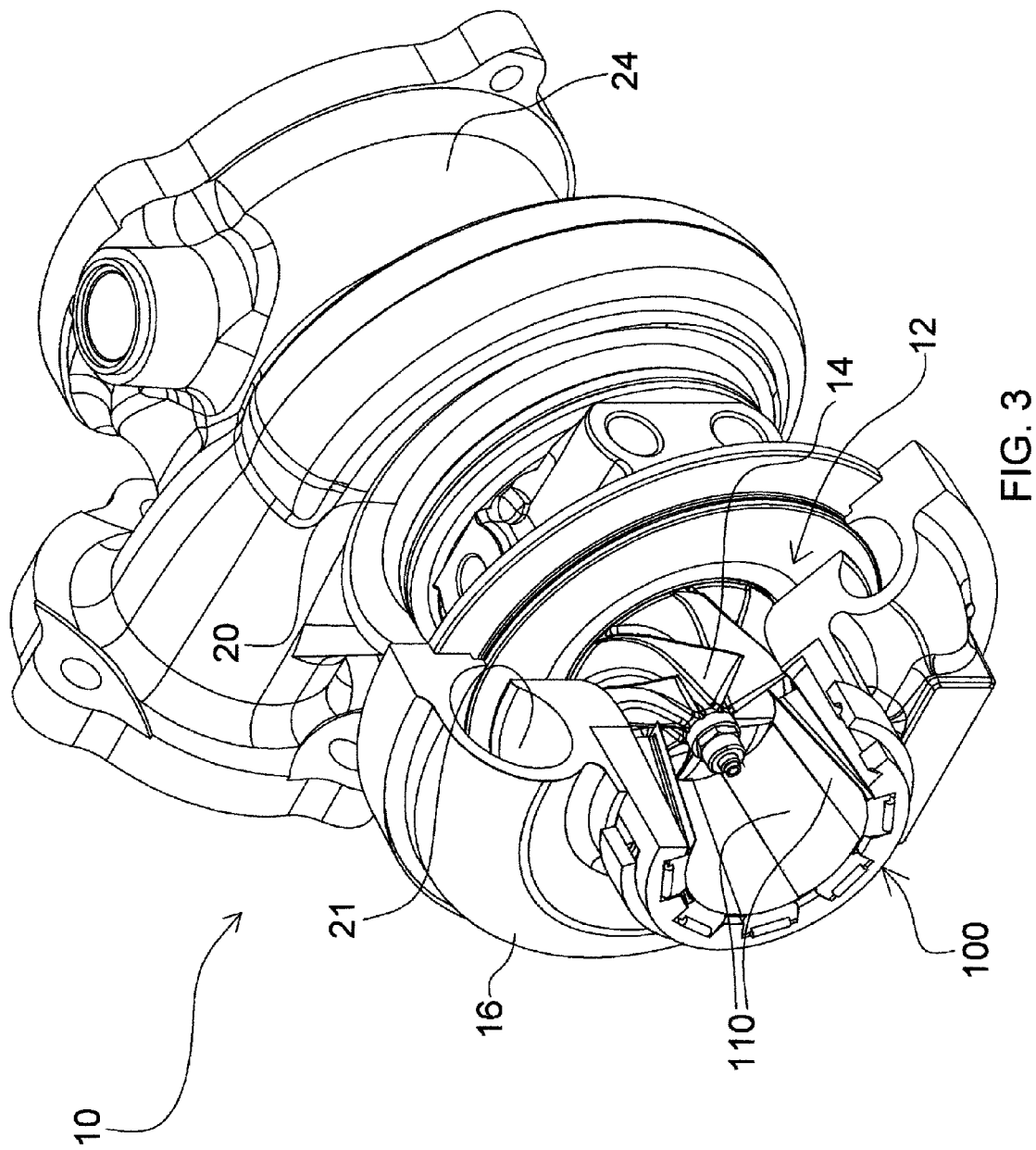
FIG. 3 is a view similar to FIG. 1, but with the inlet-adjustment mechanism in the closed position.
Figure 4:
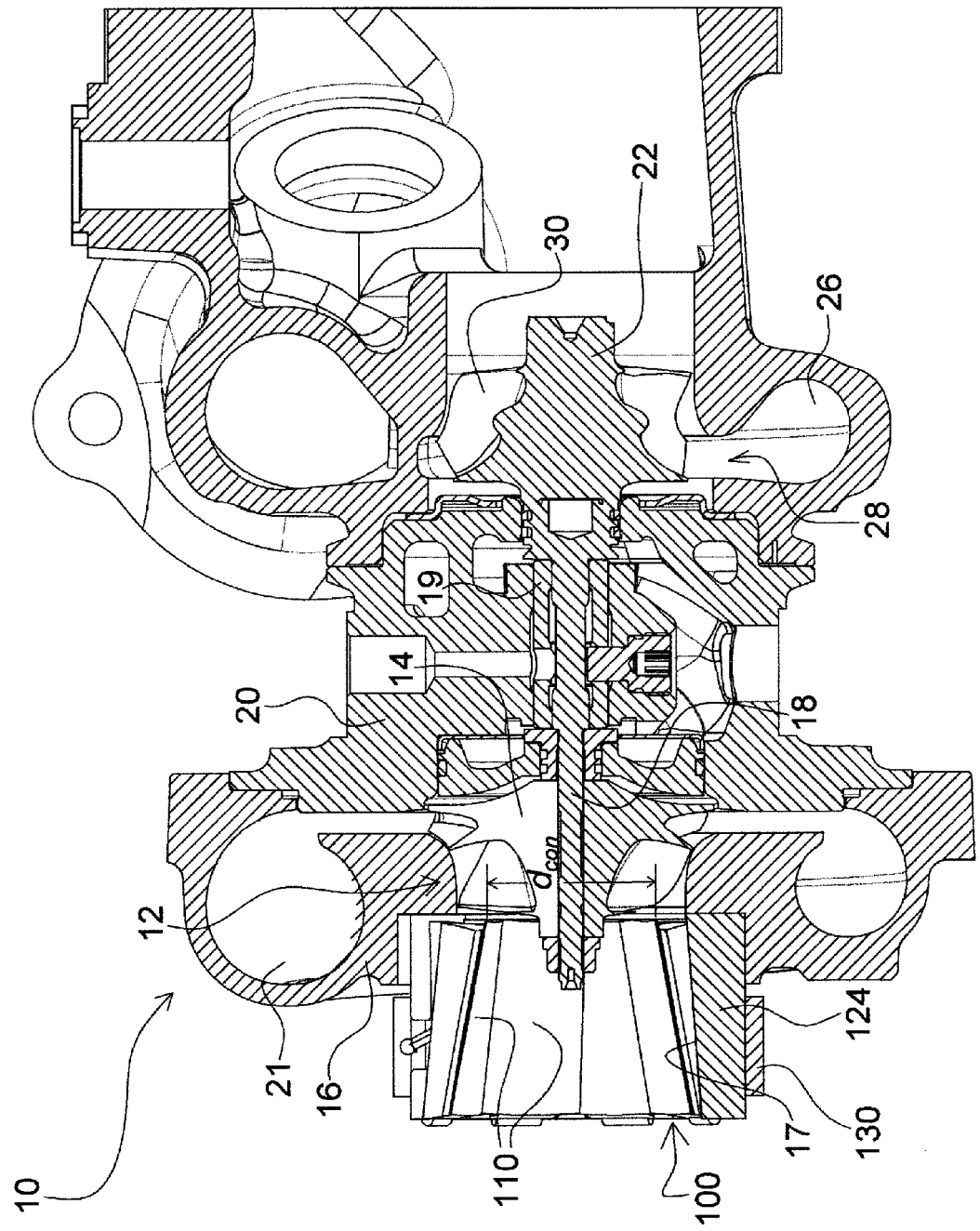
FIG. 4 is view similar to FIG. 2, but with the inlet-adjustment mechanism in the closed position.
Figure 5:
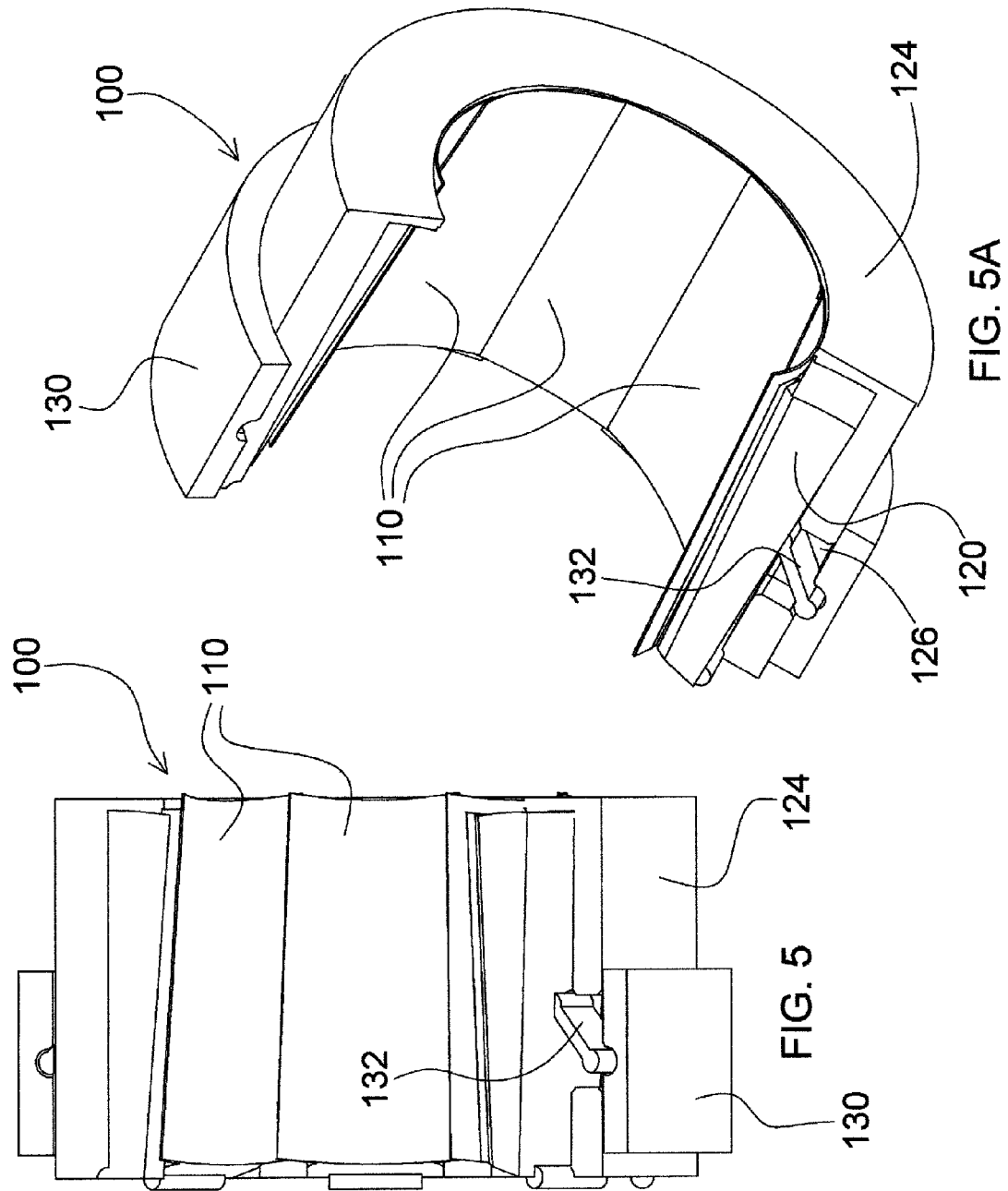
FIG. 5 is an axial cross-sectional view of the inlet-adjustment mechanism according to the first embodiment, in the open position.

In accordance with the invention, the compressor of the turbocharger includes an inlet-adjustment mechanism 100 disposed in the air inlet 17 of the compressor housing just upstream of the shroud surface 16s and inducer portion 14i. The mechanism 100 is movable between an open position (FIGS. 1 and 2) and a closed position (FIGS. 3 and 4). The inlet-adjustment mechanism comprises variable-geometry conduit. The variable-geometry conduit in the closed position has a trailing edge inner diameter $d_{con}$ that is smaller than an inner diameter of the shroud surface 16s of the compressor housing at the inducer portion of the compressor wheel, and the variable-geometry conduit in the closed position is positioned such that the effective diameter of the air inlet at the inducer portion is determined by the inner diameter $d_{con}$ of the variable-geometry conduit. The variable-geometry conduit in the open position is moved so as to increase the trailing edge inner diameter such that an effective diameter of the air inlet at the inducer portion is determined by the shroud surface 16s.

The variable-geometry conduit 100 is spaced upstream of the inducer 14i of the compressor wheel 14 by as small a distance as practicable so as to maximize the effect of the orifice on the effective diameter of the air inlet at the inducer portion.

Figure 6:
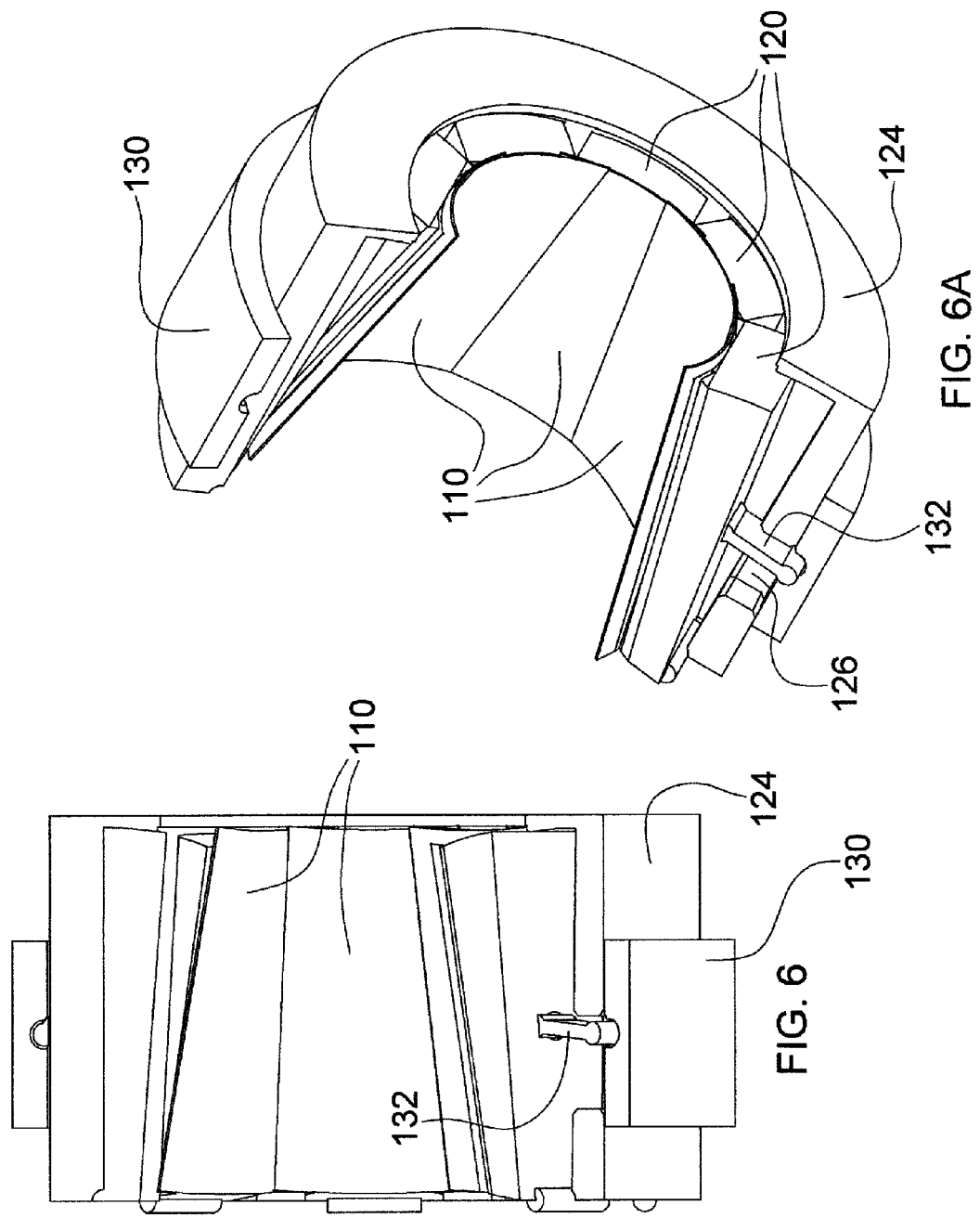
FIG. 6 is view similar to FIG. 5, with the inlet-adjustment mechanism in the closed position.
Figure 7:
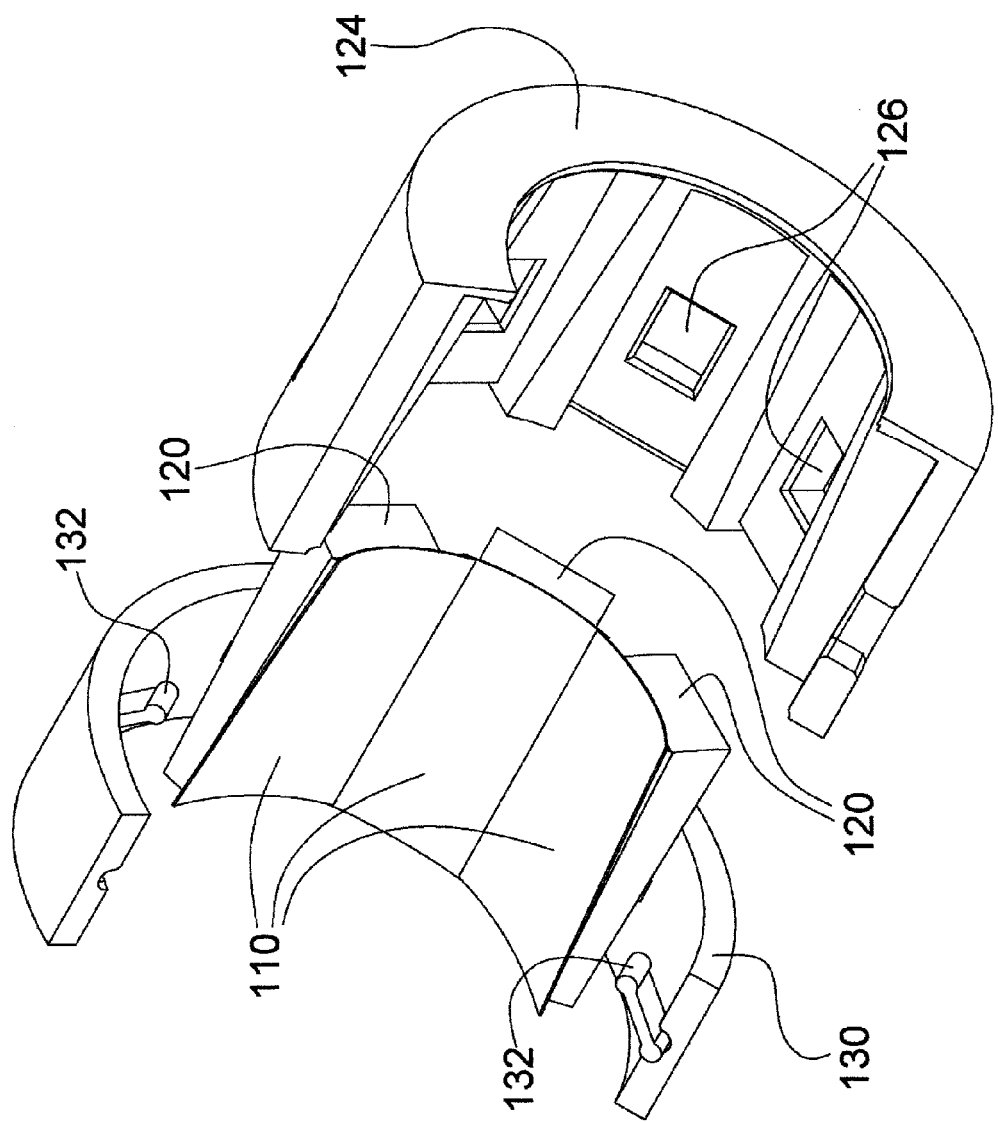
FIG. 7 is an exploded sectioned view of the inlet-adjustment mechanism according to the first embodiment.

More particularly, the variable-geometry conduit 100 comprises a plurality of vanes 110 that in the closed position (FIGS. 3 and 4) collectively form a converging inlet member. The mechanism includes a plurality of vane-moving members 120 disposed on radially outer sides of the vanes 110, one said vane-moving member for each said vane, and an actuator member 130 engaged with the vane-moving members. The actuator member is movable so as to urge the vane-moving members 120 radially inwardly and radially outwardly for moving the variable-geometry conduit between the closed and open positions respectively. More specifically, the vane-moving members 120 are retained in an outer housing or shell 124 that surrounds the assembly of vanes and vane-moving members. The shell 124 includes apertures 126, one for each vane-moving member. Control arms 132, one for each vane-moving member 120, have radially outer ends engaged with the actuator member 130 and radially inner ends extending through the apertures 126 and engaged with the vane-moving members. The control arms 132 are arranged such that axial movement of the actuator member 130 causes the control arms to pivot about respective axes that extend substantially in the circumferential direction about the axis of the compressor. Thus, in one axial position of the actuator member 130, the control arms 132 are tilted more toward the axial direction of the compressor (FIGS. 5 and 5A), and in another axial position of the actuator member, the control arms are tilted less in the axial direction and more in the radial direction (FIGS. 6 and 6A). The inner ends of the control arms 132 engage the vane-moving members 120 at a location spaced downstream from the leading edges of the vane-moving members, and accordingly, the pivoting of the control arms 132 causes the vane-moving members 120 to pivot about their leading edges (each pivoting about an axis that extends substantially in the circumferential direction about the compressor axis). This in turn causes the vanes 110 to also pivot about their leading edges; alternatively, the vanes can be arranged to pivot about a pivot point intermediate the leading and trailing edges with suitable adjustments in the mechanism. In this manner, the effective inlet diameter for the compressor, provided by the inlet-adjustment mechanism 100, can be varied depending on compressor operating conditions. FIGS. 1, 2, 5, and 5A depict an open position of the inlet-adjustment mechanism, and FIGS. 3, 4, 6, and 6A depict a closed position of the mechanism.

An alternative embodiment of the invention is illustrated in FIGS. 8 and 8A. The inlet-adjustment mechanism 200 of this embodiment is generally similar to that described above, except that the actuator member is rotatable rather than axially slidable. More particularly, the inlet-adjustment mechanism 200 includes a plurality of vanes 210 that in the closed position collectively form a converging inlet member. The mechanism includes a plurality of vane-moving members 220 disposed on radially outer sides of the vanes 210, one said vane-moving member for each said vane, and an actuator member 230 engaged with the vane-moving members. The actuator member is rotatable so as to urge the vane-moving members 220 radially inwardly and radially outwardly for moving the variable-geometry conduit between the closed and open positions respectively. More specifically, the vane-moving members 220 are retained in an outer housing or shell 224 that surrounds the assembly of vanes and vane-moving members. The shell 224 includes apertures 226, one for each vane-moving member. Control arms 232, one for each vane-moving member 220, have radially outer ends engaged with the actuator member 230 and radially inner ends extending through the apertures 226 and engaged with the vane-moving members. The control arms 232 are arranged such that rotational movement of the actuator member 230 causes the control arms to pivot about respective axes that extend substantially in the axial direction of the compressor. Thus, in one rotational position of the actuator member 230, the control arms 232 are tilted more toward the circumferential direction of the compressor, and in another rotational position of the actuator member, the control arms are tilted less in the circumferential direction and more in the radial direction. The inner ends of the control arms 232 engage the vane-moving members 220 at a location spaced downstream from the leading edges of the vane-moving members, and accordingly, the pivoting of the control arms 232 causes the vane-moving members 220 to pivot about their leading edges (each pivoting about an axis that extends substantially in the circumferential direction about the compressor axis). This in turn causes the vanes 210 to also pivot about their leading edges. In this manner, the effective inlet diameter for the compressor, provided by the inlet-adjustment mechanism 200, can be varied depending on compressor operating conditions.

Thus, the control arms 132, 232 constitute a transmission that converts the movement of the actuator member 130, 230 (whether axial in the case of actuator member 130 or rotational in the case of actuator member 230) into pivoting of the vane-moving members 120, 220. While control arms have been described as a suitable such transmission, other types of transmissions can be used instead without substantially altering the functionality of the inlet-adjustment mechanism. For example, cam arrangements between the actuator member and the vane-moving members can be used for converting the movement of the actuator member into the desired pivoting of the vane-moving members.

At low flow rates (e.g., low engine speeds), the inlet-adjustment mechanism 100, 200 can be placed in the closed position (e.g., FIGS. 3, 4, 6, and 6A). This can have the effect of reducing the effective inlet diameter into the inducer portion of the compressor wheel and thus of increasing the flow velocity into the wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At higher flow rates, the inlet-adjustment mechanism 100, 200 can be opened partially or fully (e.g., FIGS. 1, 2, 5, and 5A)), depending on the particular operating point of the compressor. When the inlet-adjustment mechanism described herein is fully opened, the compressor regains its high-flow performance and choke flow essentially as if the inlet-adjustment mechanism were not present and as if the compressor had a conventional inlet matched to the wheel diameter at the inducer portion of the wheel.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
   a turbine housing and a turbine wheel mounted in the turbine housing and connected to a rotatable shaft for rotation therewith, the turbine housing receiving exhaust gas and supplying the exhaust gas to the turbine wheel;
   a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the compressor wheel, the compressor housing further defining a volute for receiving compressed air discharged generally radially outwardly from the compressor wheel, the compressor housing defining a shroud surface that is adjacent to outer tips of the blades of the compressor wheel;
   a compressor inlet-adjustment mechanism disposed in the air inlet and being movable between an open position and a closed position, the inlet-adjustment mechanism comprising a variable-geometry conduit comprising a plurality of vanes that in the closed position collectively form a converging inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conduit, the vanes in the open position being pivoted radially outwardly so as to increase the trailing edge inner diameter of the inlet member and thereby increase the effective diameter of the air inlet at the inducer portion,
   the variable-geometry conduit further including a plurality of vane-moving members disposed on radially outer sides of the vanes, wherein each of the vane-moving members pivots about a leading edge of the vane-moving member, a movable actuator member engaged with the vane-moving members, and a transmission that converts the movement of the actuator member into pivoting of the vane-moving members for moving the variable-geometry conduit between the closed and open positions respectively.

2. The turbocharger of claim 1, wherein the actuator member is axially movable for adjusting the inlet-adjustment mechanism between the open and closed positions.

3. The turbocharger of claim 2, wherein the transmission includes control arms that have respective radially outer ends engaged with the actuator member and radially inner ends respectively engaged with the vane-moving members, the control arms being arranged such that axial movement of the actuator member causes the control arms to pivot about respective axes that extend substantially in a circumferential direction about an axis of the compressor, wherein in one axial position of the actuator member the control arms are tilted more toward the circumferential direction of the compressor, and in another axial position of the actuator member the control arms are tilted less in the circumferential direction and more in a radial direction of the compressor, the inner ends of the control arms engaging the vane-moving members at a location spaced downstream from the leading edges of the vane-moving members, such that pivoting of the control arms causes the vane-moving members to pivot which in turn causes the vanes to also pivot.

4. The turbocharger of claim 1, wherein the actuator member is rotatable for adjusting the inlet-adjustment mechanism between the open and closed positions.

5. The turbocharger of claim 4, wherein the transmission includes control arms that have respective radially outer ends engaged with the actuator member and radially inner ends respectively engaged with the vane-moving members, the control arms being arranged such that rotational movement of the actuator member causes the control arms to pivot about respective axes that extend substantially in an axial direction of the compressor, wherein in one rotational position of the actuator member the control arms are tilted more toward a circumferential direction about an axis of the compressor, and in another rotational position of the actuator member the control arms are tilted less in the circumferential direction and more in a radial direction, the inner ends of the control arms engaging the vane-moving members at a location spaced downstream from the leading edges of the vane-moving members such that pivoting of the control arms causes the vane-moving members to pivot which in turn causes the vanes to also pivot.

* * * * *